Aug. 7, 1928.  
J. H. HAMMOND, JR  
BOAT RACE INDICATOR  
Filed Sept. 28, 1922  
1,680,040  
2 Sheets-Sheet 1
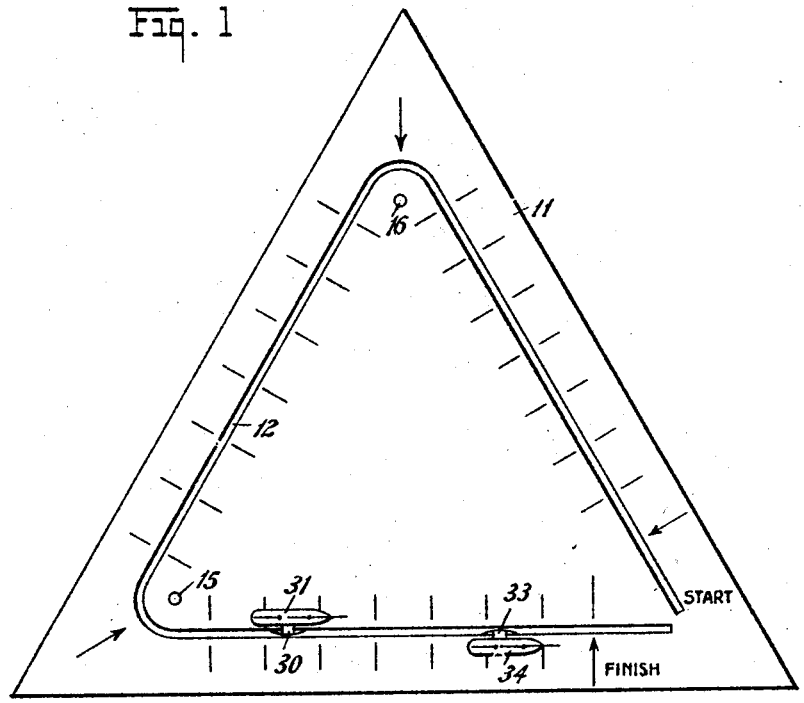
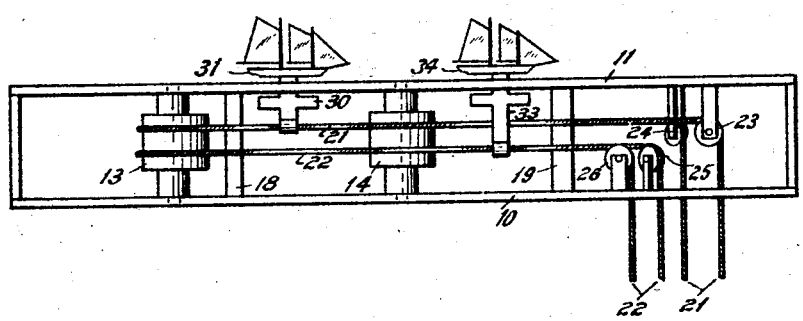
Inventor  
John Hays Hammond, Jr.  
By his Attorney A. P. Gardner Aug. 7, 1928.
J. H. HAMMOND, JR
1,680,040
BOAT RACE INDICATOR
Filed Sept. 28, 1922    2 Sheets-Sheet 2
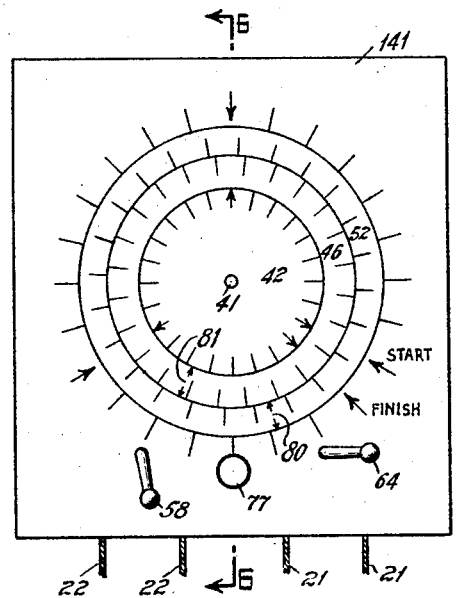
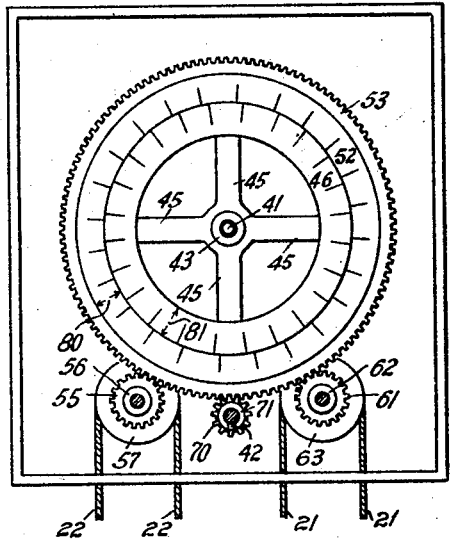
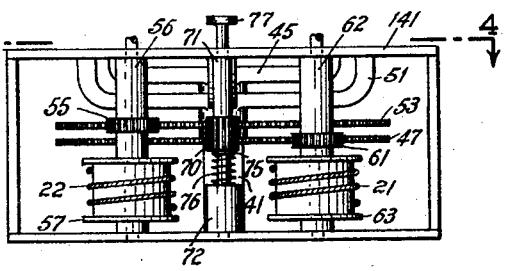
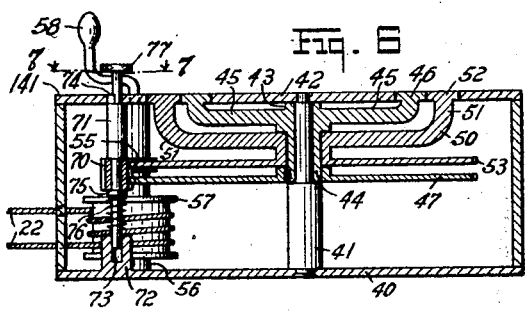
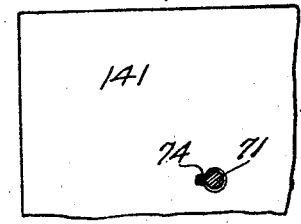
Inventor
John Hays Hammond, Jr.
By his Attorney
A. S. Gardner Patented Aug. 7, 1928.

1,680,040

UNITED STATES PATENT OFFICE.

JOHN HAYS HAMMOND, JR., OF GLOUCESTER, MASSACHUSETTS.

BOAT-RACE INDICATOR.

Application filed September 28, 1922. Serial No. 591,194.

This invention relates to apparatus for indicating the progress of a boat race or other speed contest.

Some of the objects of the invention are to provide an indicator simulating the race in all essential features except size, in such a manner that the progress of the race may readily be displayed to observers who can not conveniently observe the race itself; to provide models representing the contestants; to provide guiding means forming a path for each of the models having the characteristics of the course of the race; to provide control mechanism for actuating each of the models, which may be operated in accordance with information received from the place of the race; to provide calibrations for the control mechanisms whereby the operation may be effected directly from the data received without any intermediate translation; to provide means for operating a number of the models at the same rate of speed; and to provide other objects as will appear hereinafter.

In the accompanying drawings Fig. 1 is a plan view of the indicating means of a system constructed in accordance with this invention. Fig. 2 is a front elevation of the same with the front plate removed. Fig. 3 is a plan view of the controlling means for operating the indicating means. Fig. 4 is a sectional plan view taken on the line 4—4 of Fig. 5. Fig. 5 is a front elevation of the same with the front plate removed. Fig. 6 is a cross section taken on line 6—6 of Fig. 3. Fig. 7 is a section taken in line 7—7 of Fig. 6.

Referring to the drawings and particularly Figures 1 and 2, one embodiment of this invention comprises a casing 10 of predetermined shape provided with a correspondingly shaped face-plate 11 in which is provided a plurality of tracks or guides such as formed by one or more grooves of predetermined configuration. One such groove 12 is shown by way of example. The shape or configuration of the casing 10, face plate 11 and groove 12 corresponds to the layout of the course on which the actual race is being held. In the present instance, a triangular shaped course is illustrated. Mounted in the casing 10 adjacent to two corners of the tracks are provided two pulleys 13 and 14 loosely mounted upon fixed shafts 15, 16 respectively so as to rotate freely. Supports 18 and 19 are provided for holding up the central portion of the face plate 11. Passing over the pulleys 13 and 14 are two cords 21 and 22 which pass over smaller pulleys 23, 24 and 25, 26 respectively. The cords 21 and 22 then pass out of the box 10 and to any desired distance over intermittent pulleys, if necessary, to the controlling means located at some distance. Rigidly secured to the cord 21 is a cross shaped member 30, the side members of which are curved and which extends through the slot 12. Mounted upon its upper end is a model of a miniature yacht 31. Rigidly secured to the cord 22 is a similar cross-shaped member 33 the cross members of which are likewise curved, but in the opposite direction from those of member 30 and which also pass through the slot 12 and to the upper end of member 34. On the face plate 11 are suitable markings such as "Start" and also markings indicating various distances covered.

The control mechanism shown in Figs. 3–6 consists of a rectangular box 40 and a cover plate 141 which is provided with a large circular opening and a number of smaller openings. Rigidly secured to the bottom of the box 40 is a shaft 41 which has rigidly secured to its other end a circular plate 42. Loosely mounted upon the shaft 41 is a primary dial member 43 having a hub 44 with four arms 45 projecting therefrom, and which in turn carry an annular dial 46. Rigidly secured to the hub 44 is the gear wheel 47. Loosely mounted upon the hub 44 is a secondary dial member 50 with four arms such as 51 carrying an annular dial 52, and a gear wheel 53 of the same size as the gear wheel 47. Meshing with the gear wheel 53 is a pinion 55 rigidly secured to a shaft 56 provided with a drum 57 about which is wound the cord 22. The shaft 56 is rotatably mounted in the box 40 and cover plate 141 and at its upper end is provided with a suitable handle 58 with which it can be rotated. Meshing with the gear wheel 47 is a pinion 61 rigidly secured to a shaft 62 which carries a drum 63 on which is wound the cord 21. The shaft 62 is rotatably mounted in the box 40 and the cover plate 141 is provided at its upper end with a suitable handle 64.

Meshing with the gears 47 and 53 is a pinion 70 rotatably mounted on a shaft 71, which is slidably mounted at the lower end in a projection 72 forming part of the box 40 and provided with a longitudinal hole 73. The upper end of the shaft 71 (see Fig. 6), is slidably mounted in the cover plate 141 and is provided with a tooth 74 which slides in a corresponding groove in the cover plate 141. Rigidly secured to the shaft 71 is a collar 75 against which presses a spiral spring 76, the other end of which presses against the projection 72. The upper end of the shaft 71 is provided with a knurled head 77.

The cover plate 141 is provided with suitable graduations adjacent to the secondary dial 52 and the plate 42 is in a similar manner provided with like graduations adjacent to the primary dial 46. The secondary dial 52 is provided with a double arrow mark 80 which corresponds to the position of the miniature yacht 34 and the secondary dial 46 is provided with a double arrow mark 81 which corresponds to the miniature yacht 31. The primary and secondary dials 46 and 52 are also provided with suitable graduations on the sides adjacent to each other.

In the operation of the form of this invention just described, the knurled head 77 is first depressed and given a slight turn either to the right or left, thus locking it in that position. This will cause the pinion 70 to be moved out of engagement with the gear 53. The miniature yachts 31 and 34 are initially placed at that end of the groove 12 marked "Start". As soon as news of the progress of the race is received, the man operating the mechanism will turn the handle 58 in a clockwise direction, thus rotating the shaft 56 which will in turn rotate the drum 57. The rotation of the drum 57 will wind up one side of the cord 22 and unwind the other side, thus causing the cord 22 to be moved over the pulleys 25, 14, 13, 26 in the counter clockwise direction, as seen in Fig. 1. As the miniature yacht 34 is secured to the cord 22, it will be moved along the slot 12. The rotation of the shaft 56 also rotates the pinion 55 which in turn rotates the gear 53 in a counter clockwise direction, thus rotating the secondary dial 52, thus moving the arrow mark 80 of this dial past the graduations on the face plate 42. The operator continues to turn the handle 58 until the arrow mark 80 is opposite the graduation corresponding to the position of the racing yacht as reported to him by any suitable means, such as for example, wireless, etc. The miniature yacht 34 will therefore have moved to a position in the slot 12 opposite the graduation on the plate 11 corresponding to the actual position of the racing yacht.

The operator will then rotate the handle 64 in a similar manner which by means of the cord 21 will move the miniature yacht 31 to a position in the slot 12 corresponding to the actual position of the other racing yacht as reported to him. The arrow mark 81 indicates on the scale on the plate 42 the position of the miniature yacht 31 so that the operator will know when the miniature yacht 31 has reached the desired position.

In a similar manner, the miniature yachts are moved around the entire course to the other end of the slot 12 marked "Finish" thus giving a graphic representation of the progress of the race.

If the racing yachts should be moving at the same rate of speed and thus keeping a constant distance apart for any length of time, the knurled head 77 can be turned until the tooth 74 slips into the slot in the plate 141 thus allowing the pinion 70 to mesh with both gears 47 and 53. By rotating either handle 58 or 64 the two miniature yachts 31 and 34 will be moved in unison over equal distances. If the distance between the two racing yachts changes, the head 77 can be momentarily depressed and the distance between the miniature yachts changed as indicated by the graduations on the dials 46 and 52 until it corresponds to the actual distance between the racing yachts when the head 77 can again be released.

The invention upon which this application is based is broader than the specific embodiments shown and described for the purpose of illustrating some of the ways in which it may be employed. The scope of the invention is therefore understood not to be limited by the present specific description. I intend no limitations other than those imposed by the appended claims.

What is claimed is:—

1. An indicator for showing status of a race, comprising a model representing each of the contestants, guiding means for each of said models having a configuration corresponding to that of the race course and a control mechanism member for positively actuating each of the models, said control mechanism including dials for showing the positions of said models, each of said dials having a configuration different from that of the respective guiding means but calibrated to show distance thereon.

2. An indicator for showing status of a race comprising a plurality of models each representing one of the contestants, a corresponding plurality of guiding means for said models respectively, each of said guiding means having a configuration corresponding to that of the race course, a corresponding plurality of movable control dials for said models respectively, each having a configuration different from that of the respective guiding means but calibrated to show distances thereon, a corresponding plurality of drums operatively interconnected with said dials respectively, and a plurality of endless belts each operatively interconnecting one of said models with its respective drum and operable upon movement of said dial for positively actuating the respective model.

3. An indicator for a boat race comprising a model representing each of the contesting boats, a guide for each of the models forming a path corresponding to the course of the race, control mechanism for each of the models operatively connected to said models respectively and aranged to move the respective model according to the progress of the boat of which it is a model, and a lock for mechanically interconnecting at least two of said control mechanisms together.

4. An indicator for a boat race comprising a model representing each of the contesting boats, a guide for each of said models forming a path for the respective model, corresponding to the course of the race, and control mechanism for said models, each control mechanism including a drum, an endless belt operatively interconnecting said drum with the respective model and a dial operatively connected to the drum and arranged to move the respective model according to the progress of the boat of which it is a model.

5. An indicator for a boat race, comprising a model representing each of the contesting boats, a guide for each of the models forming a path having a curved portion and a straight portion, a control device for each model having a movement wholly curved, a gear secured to each control device, means operatively interconnecting each control device with its respective model, and a slidable pinion movable into mesh with said gears to lock the respective control devices together for simultaneous movement.

In testimony whereof I hereunto affix my signature.

JOHN HAYS HAMMOND, Jr.